(12) United States Patent
Palin et al.

(10) Patent No.: US 8,028,533 B2
(45) Date of Patent: Oct. 4, 2011

(54) DEFROST INDICATOR

(75) Inventors: Erik S. Palin, Spanish Fort, AL (US); Jozefina Cimbalova, Spanish Fort, AL (US)

(73) Assignee: E & J Enterprises, LLC, Reno, NV (US)

( * ) Notice: Subject to any disclaimer, the term of this patent is extended or adjusted under 35 U.S.C. 154(b) by 258 days.

(21) Appl. No.: 12/387,090

(22) Filed: Apr. 27, 2009

(65) Prior Publication Data

US 2009/0211268 A1   Aug. 27, 2009

Related U.S. Application Data

(63) Continuation-in-part of application No. 12/315,046, filed on Nov. 25, 2008.

(60) Provisional application No. 61/004,724, filed on Nov. 28, 2007.

(51) Int. Cl.
*F25C 1/00* (2006.01)

(52) U.S. Cl. .................. 62/66; 62/129; 62/234

(58) Field of Classification Search .................. 62/192, 62/66, 441, 465, 324, 129, 151, 80; 426/88; 116/201, 112, 207, 211, 216, 219
See application file for complete search history.

(56) References Cited

U.S. PATENT DOCUMENTS

| | | | |
|---|---|---|---|
| 3,177,843 A | 4/1965 | Geocaris | |
| 3,362,834 A * | 1/1968 | Kaye | 116/219 |
| 3,702,077 A * | 11/1972 | Szabo | 116/217 |
| 3,844,718 A * | 10/1974 | Cohen | 422/408 |
| 3,958,528 A * | 5/1976 | Hill | 116/219 |
| 4,144,834 A * | 3/1979 | Donegan | 116/219 |
| 4,280,361 A | 7/1981 | Sala | |
| 4,327,117 A | 4/1982 | Lenack et al. | |
| 4,432,656 A * | 2/1984 | Allmendinger | 374/102 |
| 4,735,745 A | 4/1988 | Preziosi et al. | |
| 4,892,677 A * | 1/1990 | Preziosi et al. | 252/408.1 |
| 5,034,233 A | 7/1991 | McCloy, Jr. | |
| 5,709,472 A * | 1/1998 | Prusik et al. | 374/106 |
| 6,042,264 A * | 3/2000 | Prusik et al. | 374/106 |
| 6,472,214 B2 * | 10/2002 | Patel | 436/2 |
| 6,679,070 B1 | 1/2004 | Liberman | |
| 2001/0046451 A1 * | 11/2001 | Patel | 422/58 |
| 2008/0026110 A1 * | 1/2008 | Cooper et al. | 426/88 |

* cited by examiner

*Primary Examiner* — Mohammad Ali
(74) *Attorney, Agent, or Firm* — David Lewis

(57) ABSTRACT

A defrost indicator is configured such that the process of freezing and defrosting the defrost indicator places the defrost indicator into a state that is not completely reversed by refreezing, so that one can detect whether the defrost indicator defrosted and refroze or never defrosted by observing its current state. In an embodiment, the defrost indicator is initially placed in a first state before being frozen (e.g., upside down with fluid in an upper chamber). Freezing the defrost indicator places it in a second state (e.g., with the fluid frozen in the upper chamber). Then when the defrost indicator is defrosted, the defrost indicator is placed into a third state that is different than the first state (e.g., right-side-up with liquid fluid in the lower chamber). If the defrost indicator is again frozen, the defrost indicator is placed into a fourth state (e.g., the fluid frozen in the lower chamber).

23 Claims, 12 Drawing Sheets

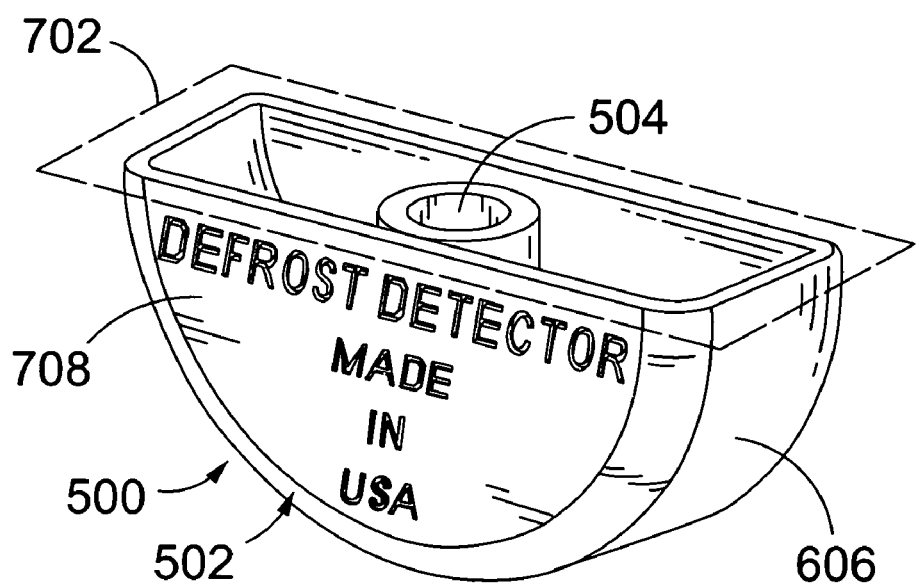
FIG. 7
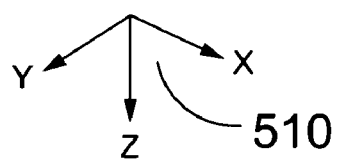

DEFROST INDICATOR

CROSS-REFERENCE TO RELATED APPLICATIONS

This application is a continuation-in-part of U.S. patent application Ser. No. 12/315,046, filed Nov. 25, 2008, entitled, Defrost Indicator, by Erik Palin and Jozefina Cimbalova, which in turn claims priority benefit of U.S. Provisional Patent Application No. 61/004,724, filed Nov. 28, 2007, entitled Defrost Indicator, by Erik Palin and Jozefina Cimbalova, all of the above applications are incorporated herein by reference. This application also incorporates by reference U.S. Provisional Patent Application No. 60/872,829, filed Dec. 4, 2006, also entitled Defrost Indicator, and also by Erik Palin and Jozefina Cimbalova.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

When transporting goods over distances, it may be desirable to keep some of those items below a certain temperature. For example, some food items it is desirable to keep frozen while in transport. It may occur that the item being transported defrosts during transport and refreezes. Although the defrosting and refreezing may damage the good being transported, it may not be readily apparent that the goods have been damaged or that the goods defrosted at some point.

SUMMARY

The process of freezing and defrosting the defrost indicator places the defrost indicator into a state that is not completely reversed by refreezing. In an embodiment, the defrost indicator is initially in a first state before being frozen. After freezing the defrost indicator is placed in a second state. Then when the defrost indicator is defrosted, the defrost indicator is placed into a third state that is different than the first state. If the defrost indicator is again frozen, the defrost indicator is placed into a fourth state that is different than the second state. In an embodiment the differences in state between the second and the fourth state are easily detected. For example, the second and the fourth state may be visually different in appearance. In an embodiment, the difference in appearance between the different states may be a result of a different color and/or configuration between the second and fourth state. In an embodiment, the differences in state between the second and the fourth state are easily detected. For example, the first and the third state may also be visually different in appearance, which in an embodiment may also result from a different color and/or configuration between the first and third state, and consequently in this embodiment the defrost indicator may also be used as a freeze indicator. In other embodiments, the defrost indicator may not have as many states as listed above as long as the state that the defrost indicator is in after defrosting and refreezing is different from the of the state of the defrost indicator after the initial freezing the defrost indicator may be used to indicate whether the temperature rose above freezing.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

FIG. 7 shows a cross section of the defrost indicator of FIG. 5 cut horizontally half way between the top and the bottom of the defrost indicator.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-12 is a brief description of each element, which may have no more than the name of each of the elements in the one of FIGS. 1-12 that is being discussed. After the brief description of each element, each element is further discussed in numerical order. In general, each of FIGS. 1-14 is discussed in numerical order and the elements within FIGS. 1-14 are also usually discussed in numerical order to facilitate easily locating the discussion of a particular element. Nonetheless, there is no one location where all of the information of any element of FIGS. 1-14 is necessarily located. Unique information about any particular element or any other aspect of any of FIGS. 1-14 may be found in, or implied by, any part of the specification.

A Single-Use Two Container Defrost Indicator

A First State of Defrost Identifier

Figure 1:
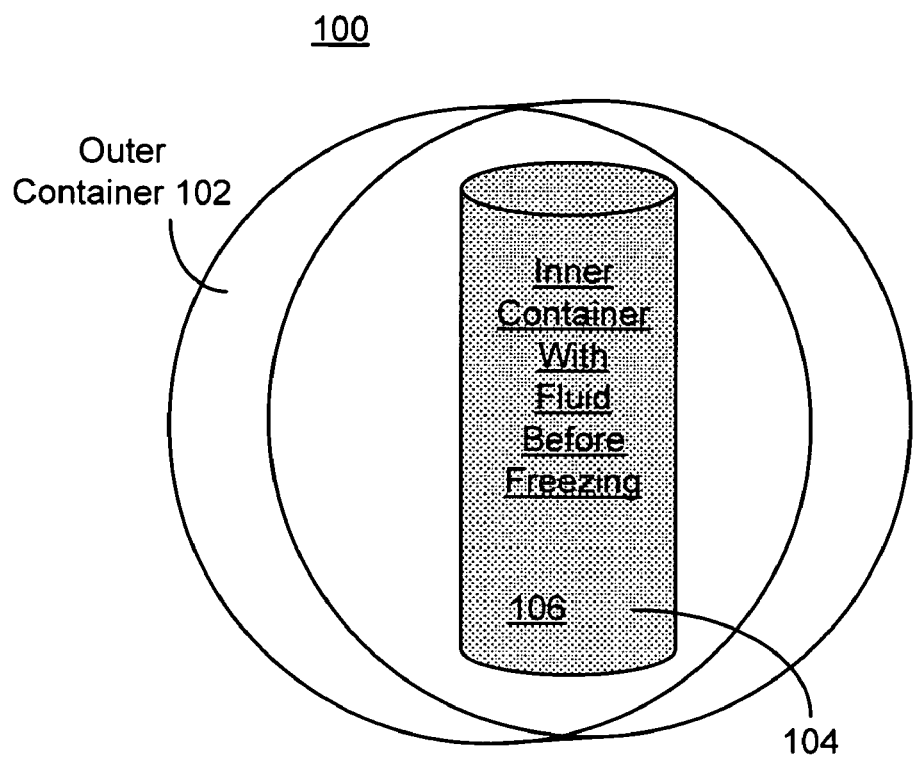
FIG. 1 shows a representation of an embodiment of the defrost indicator prior to being frozen.

FIG. 1 shows a representation of an embodiment of the defrost indicator 100 prior to being frozen. Defrost indicator 100 includes outer container 102, inner container 104, and fluid 106. In other embodiments, defrost indicator 100 may not have all of the elements or features listed and/or may have other elements or features instead of or in addition to those listed.

Defrost indicator 100 may be useful for detecting whether or not an item may have been subject to temperatures that were above freezing or defrosted. In this specification, any place a "defrost indicator" is described an embodiment of the defrost indicator is a defrost detector. FIG. 1 illustrates defrost indicator 100 while defrost indicator 100 is in its first state. Outer container 102 contains the rest of the defrost indicator. In one embodiment, the walls of outer container 102 are made from 2 mm thick plastic.

Inner container 104 is mounted in outer container 102. Inner container 104 has thin walls made from a material, such as glass or plastic, so that when the defrost indicator freezes, the walls of the inner container crack. In an embodiment, the inner container 104 is made from a transparent material or has a transparent window so that the viewer can see whether or not fluid 106 is still inside and/or has the shape of the inner container 104. In one embodiment, a portion of, or all of, the walls of inner container 104 are made from thin plastic are made from ½ mm thick plastic.

Fluid 106 is placed inside inner container 104 prior to freezing defrost indicator 100. Fluid 106 does not leak prior to freezing or while frozen.

In an embodiment, fluid 106 expands in the process of freezing (e.g., as a result of including water), which may cause the walls of inner container 104 to break. For example, fluid 106 may be a saline solution. Different items freeze at different temperatures. Accordingly, the compositions of the fluid in the inner and/or outer fluid may be varied to freeze at different temperatures so that the freezing points of the defrost indicator and the item being monitored are the same or close enough to one another so that the state of the defrost indicator is a meaningful indication of whether the item being monitored defrosted. For example, in an embodiment, the amount of salt or the amount of another material that is in fluid 106 is adjusted to change the temperature at which fluid 106 freezes. In other words, if it is desired to keep the an item at a temperature that is lower than freezing it may be desirable to add an amount of salt and/or other material to the solution so that that fluid 106 freezes at the temperature at which the item is desired to be stored. Optionally, fluid 106 is colored so that it is easier to determine whether fluid 106 is still within inner container 104 or has leaked out (e.g., as a result of defrosting). In an embodiment, fluid 106 may be made by mixing water with FD&C Green #3 0.30-0.25 ml, and Sodium Chloride (ppm) 2100-1750. In an embodiment, any tap water is used. In an embodiment, the water may be distilled water. Fluid 106 is discussed further in conjunction with the embodiment of FIGS. 5-8.

Defrost indicator 100 may be constructed from any system in which there is a visible difference between the initially frozen state and the refrozen state. In one embodiment, initially there may be no fluid in outer container 102. Alternatively there may be two fluids, one that is in outer container 102 and one that is in inner container 104. If two fluids are used, fluid 106 may be immiscible with the fluid inside outer container 102. Thus, when fluid 106 leaks out of inner container 104, the two fluids that do not mix are located inside outer container 102, which are both visible as separate fluids as a result of not mixing and having different colors. As another example, the fluid in inner container 104 may be a colored saline solution or vinegar and the fluid in the outer container 102 may be an oil. There are many other embodiments of the defrost indicator, which may use many other fluids and/or combinations of fluids. For example, the two immiscible fluids may have two different colors. In another embodiment, the colored fluid may be in the outer container and the inner container may have a clear fluid (or no fluid). The two immiscible fluids are discussed in conjunction with the discussion of FIG. 3.

A Second State of Defrost Indicator

Figure 2:
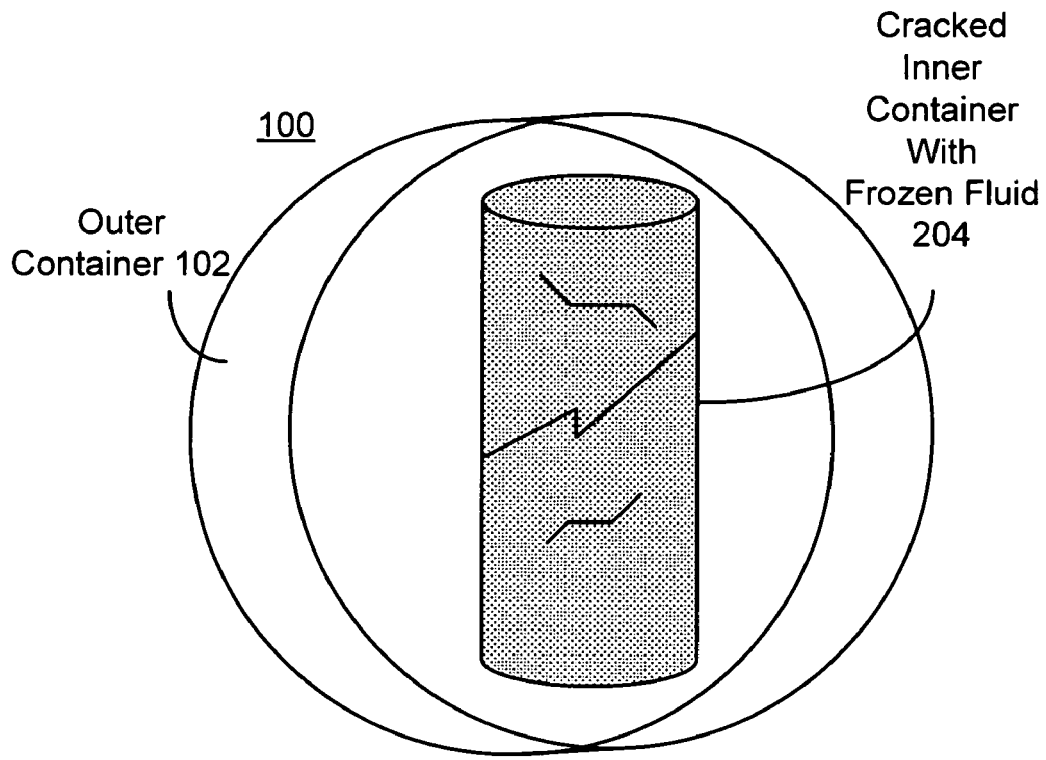
FIG. 2 shows a representation of an embodiment of the defrost indicator of FIG. 1 while frozen.

FIG. 2 shows a representation of an embodiment of the defrost indicator 100 while frozen. FIG. 2, like FIG. 1, shows outer container 102 and fluid 106. However, FIG. 2 has inner container 204 instead of inner container 104. In other embodiments, defrost indicator 100, while frozen, may not have all of the elements or features listed and/or may have other elements or features instead of or in addition to those listed.

FIG. 2 illustrates defrost indicator 100 while it is in its second state, as a result of freezing. Inner container 204 is inner container 104 except inner container 204 has cracked as a result of freezing. Since fluid 106 is frozen, fluid 106 does not leak out of inner container 204 even though inner container 204 is cracked. The cracking of container 204 is process that occurs as a result of freezing that is not reversed by defrosting defrost indicator 100.

A Third and Fourth State of Defrost Indicator

Figure 3:
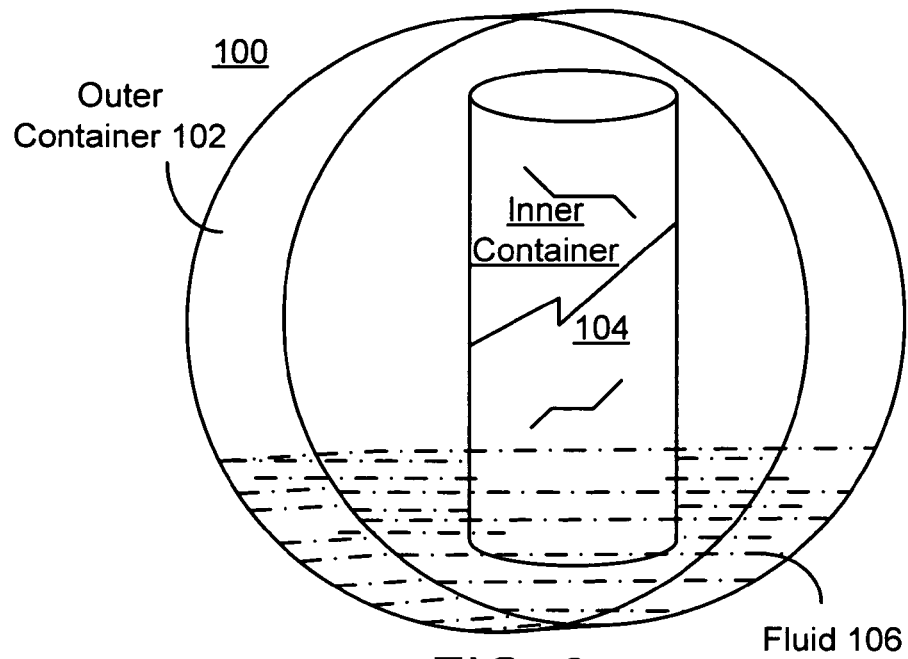
FIG. 3 shows a representation of an embodiment of defrost indicator of FIG. 1 after defrosting and refreezing.

FIG. 3 shows a representation of an embodiment of defrost indicator 100 after defrosting and refreezing. FIG. 3, like FIG. 2 shows outer container 102, fluid 106, and inner container 204. In other embodiments, defrost indicator 100 after defrosting and refreezing may not have all of the elements or features listed and/or may have other elements or features instead of or in addition to those listed.

FIG. 3 illustrates defrost indicator 100 while defrost indicator 100 is in its third state as a result of defrosting or in its fourth state as a result of refreezing. As in FIG. 2, inner container 204 is still cracked. However, in contrast to FIG. 2, instead of being stored within container 204, fluid 106 has leaked out of inner container 204, as a result of defrosting, and then refroze at the bottom of the outer container 102. After fluid 106 leaks out of leaking out of inner container 104, but while fluid 106 is still in a liquid state, defrost indicator 100 corresponds to the third state mentioned in the SUMMARY. When fluid 106 refreezes, correspond to the fourth state mentioned in the SUMMARY. The leaking of fluid 106 out of container 204 is a process that occurs as a result of defrost indicator being frozen and then defrosted that is not reversed by refreezing defrost indicator 100. Other systems exhibiting other processes that result from freezing and defrost that are not reversed by refreezing may be incorporated in the defrost indicator instead of the system of defrost system 100.

Putting together the information of FIGS. 1-3, if the temperature rises above the freezing point of the fluid 106, fluid 106 begins to melt into the outer container 102. If the temperature then drops below the freezing point of fluid 106, fluid 106 refreezes. However, now although fluid 106 is frozen, fluid 106 is no longer has the same shape as inner container 104. Consequently, one can infer that the temperature dropped below freezing, and the frozen items with which the defrost indicator was frozen, or to which the defrost indicator was attached, may have defrosted. In another embodiment, defrost indicator 100 is filled with a fluid that is immiscible with a colored fluid. For example, the fluid inside the outer container may be oil, such as a vegetable oil. By filling the outer container with an immiscible fluid, when the colored fluid melts it tends not disperse throughout the outer container, but tends to stay together and freeze together in one place. Defrost container 100 may be reused be replacing inner container 104.

A Single Container Defrost Indicator

Figure 4:
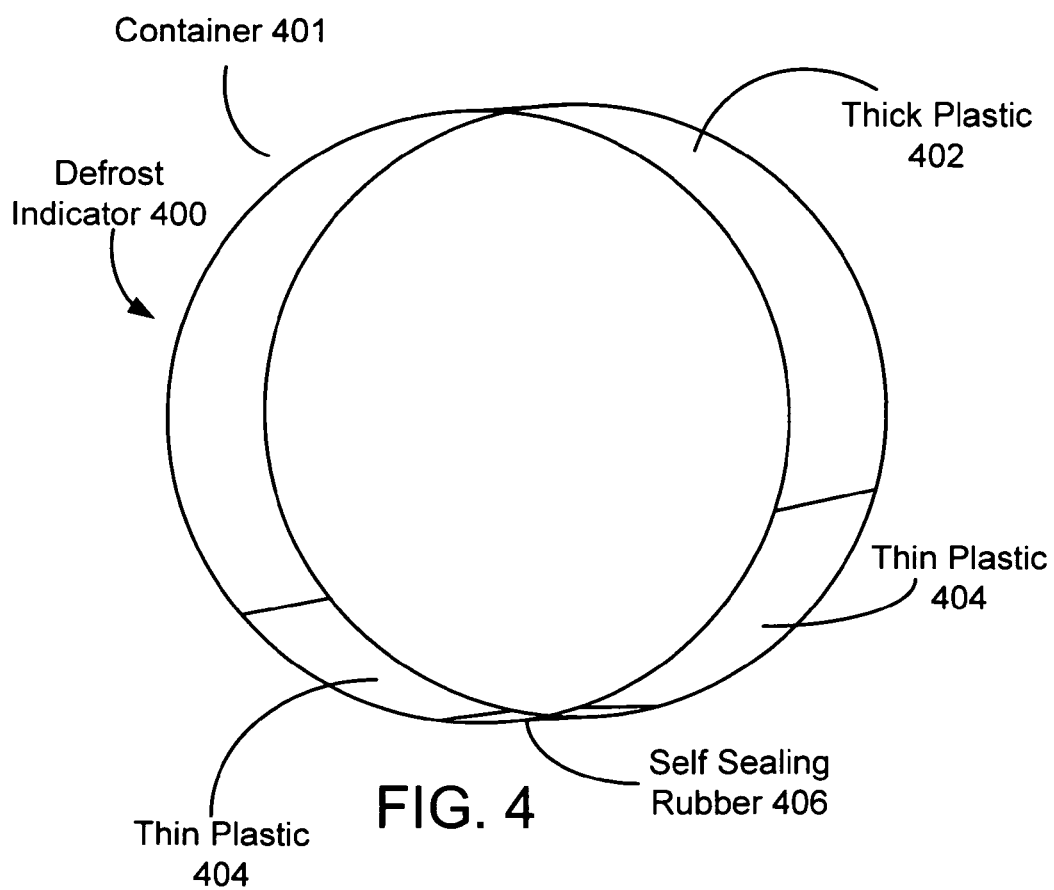
FIG. 4 shows a representation of another embodiment of a defrost indicator.

FIG. 4 shows a representation of defrost indicator 400, which is another embodiment of a defrost indicator. Defrost indicator 400 includes container 401 having weak walls 404, optional self sealing walls 406, and strong walls 408. In other embodiments, defrost indicator 400 may not have all of the elements or features listed and/or may have other elements or features instead of or in addition to those listed.

Defrost indicator 400 does not have an inner container. Container 401 is the only container of defrost indicator 400. Defrost indicator 400 is one example of a defrost container in the container is completely filled with a fluid, and the container has walls of at least two different portions of different strengths (e.g., the container has walls of at least two different thicknesses and/or materials). For example, the container has most of its wall made from a relatively thick plastic or glass and a second portion made from a thin plastic or glass. Consequently, when the container freezes, the relatively weak portion (e.g., the thin glass or plastic portion) of the container breaks. For example, if the colored liquid is a saline solution or another liquid containing enough water, the colored liquid will expand and break the relatively weak portion (e.g., the thin glass or plastic). Then, if the container defrosts, the colored liquid leaks out. The same fluids used as fluid 106 may be used in defrost indicator 400 (or visa versa). The same materials used for making outer container 102 may be used for making defrost indicator 400 (or visa versa).

Specifically in defrost indicator 400, weak walls 404 tend to crack when container 401 is filled with a fluid that expands and then frozen. In an embodiment, weak walls 404 may be made from thin plastic or glass. In one embodiment, weak walls 404, the relatively weak portion of defrost indicator 400 (e.g., the weak portion of FIG. 4 similar to the inner container of FIGS. 1-3) is made from thin portions are made from ½ mm thick plastic.

Optionally, self sealing walls 406 seal after being punctures by a needle. If self sealing walls 406 are present, the user or manufacturer may inject the fluid into container 401 by puncturing the self sealing with a needle and filling the fluid into the defrost detector via the needle. After container 401 is full, the needle may be removed, and self sealing walls 406 seal holding the fluid within container 401. In an embodiment, self sealing walls 401 are made form a self sealing rubber.

Strong walls 408 are strong enough so as not to crack as a result of being frozen. Strong wall 408 ensure that the defrost indicator 400 is sturdy and does not crack as a result of pressure or banging. In an embodiment, strong walls 408 are made from thick plastic. In one embodiment, strong walls 408, the relatively strong portion of the defrost indicator (e.g., the strong portion of FIG. 4 similar to the outer container of FIGS. 1-3) is made from 2 mm thick plastic.

In an embodiment, the fluid inside defrost indicator 400 is a saline solution, such as fluid 106. If the defrost indicator defrosts, some fluid will leak out, and the observer can tell that the defrost indicator defrosted by the absence of the some of the fluid in the defrost indicator 400 or by the presence of some fluid outside of defrost indicator 400. Defrost indicator 400 may be reused by replacing weak walls 404 and refilling container 401 with fluid.

Figure 5:
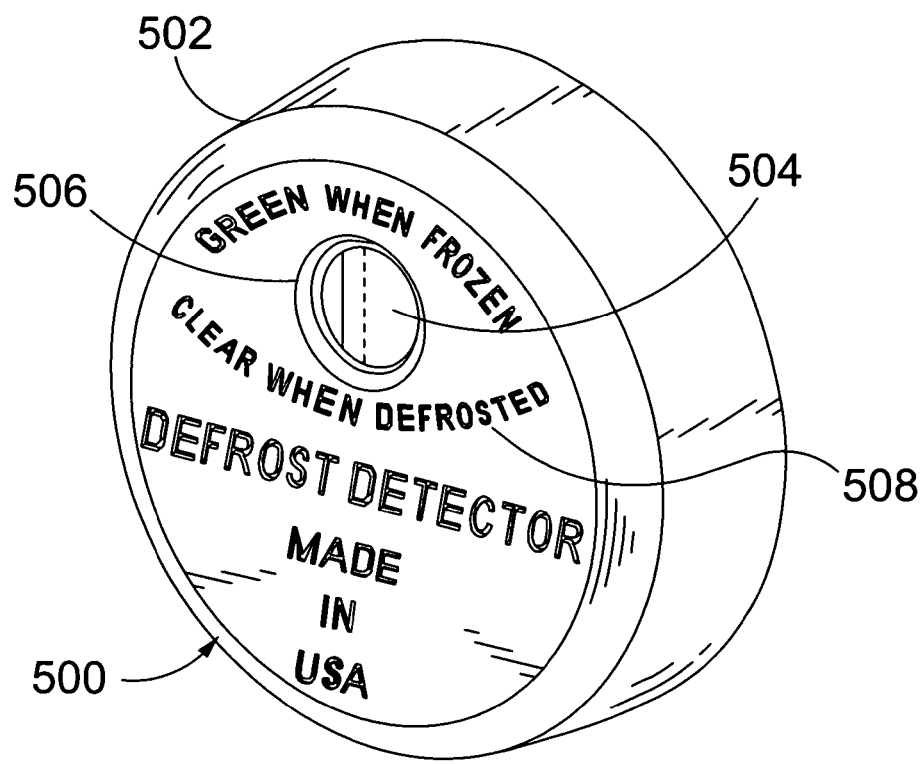
FIG. 5 shows a representation of another embodiment of the defrost indicator.
Figure 5:
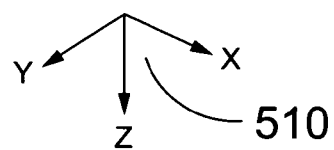

A Defrost Indicator Having a Multiple-Use Inner Container View of Outside of Defrost Indicator FIG. 5 shows a representation of a defrost indicator 500. Defrost indicator 500 may include outer container 502, which contains inner container 504. Outer container 502 may include window 506, and legends 508. FIG. 5 also shows axis 510. In other embodiments, defrost indicator 500 may not have all of the elements or features listed and/or may have other elements or features instead of or in addition to those listed.

Defrost indicator 500 is capable of being used multiple times. Outer container 502 is similar to outer container 102. However, outer container 102 catches the fluids that leak out of inner container 104, whereas the fluids stay in the inner container 504 (which is within outer container 502). In an embodiment, outer container 502 may include a thermoplastic, such as Acrylonitrile Butadiene Styrene (ABS) plastic. In an embodiment, the walls of outer container 502 are held together by press fitting instead of using adhesives or mechanical snap/thread arrangement as it was found to work better during prototype testing with the thermal loading of the freeze/defrost thermal cycling.

Inner container 504 contains a fluid, and visibly changes state as a result of freezing and defrosting without leaking out of inner container 504. Inner container 504 may also be held together and/or held in place within outer container 502 by ultrasonic welding. In an embodiment, inner container 504 is held in place within container 502 by a press fit. In an embodiment, inner container 504 is made from a synthetic thermal plastic, which may be a polycarbonate, such as poly bisphenol A carbonate, sold by GE under the name Lexan.

The fluid within inner container 504 may be a saline solution and/or any of the fluids used for fluid 106. In an embodiment, 1.75 ml±0.25 ml of fluid 106 was included in inner container 504. Fluid 106 occupied 40% of the volume of the container and the rest of the inner container 504 was filled with air. Fluid 106 took 12 to 45 minutes to defrost, depending on what the other contents items were stored in the freezer. In an embodiment fluid 106 has an alkalinity of (ppm) 132.0-69.0 and a PH of 6.5-8.5. In an embodiment, the hardness (ppm) of fluid 106 while frozen is 130.00-56.70. In an embodiment, tap water from the Northwest Pacific was found to work better that tap water from the South East and tap water from Texas. The tap water from the Northwest Pacific that was used for one embodiment of fluid 106 was tested and found to include Boron (ppm) 0.04-0.00
Bromodichloromethane (THM) (ppb) 0.70-0.0000
Bromoform (THM) (ppb) 0.50-0.0000
Calcium (ppm) 34.20-11.80
Chloroform (THM) (ppb) 1.00-0.0000
Dibromochloromethane (THM) (ppb) 0.80-0.0000
Magnesium (ppm) 11.00-6.36
Perchlorate (ppm) 0.00243-0.00
Potassium (ppm) 3.95-1.88
Radon 222 (pci/L) 609.70
Copper (ppm) 0.09-0.00
Fluoride (ppm) 1.3-0.00
Total Nitrates (ppm) 9.70-0.00
Sodium (ppm) 34.00-19.68
Sulfate (ppm) 14.00-0.00
Trihalomethane (ppb) 3.00-0.00
Gross Beta (pci/L) 5.2-0.0.

The tap water from the Northwest Pacific, having the listed contents was found to be less likely to cause clouding in the inner container 504 than other waters. The fluid used for inner container 504 may also be used for inner container 104 or for defrost indicator 400.

Window 506 shows inner container 504, so that the user may view the state of the fluid within inner container 504. In an alternative embodiment, inner container 504 may contain two immiscible fluids. Above, an alternative of embodiment of defrost indicator 100 was described in which two immiscible fluids were used. However, in the alternative embodiment of defrost indicator 100, one immiscible fluid was initially in inner container 104 and the other immiscible fluid was outside of (and surrounding) inner container 104, but inside outer container 102. In contrast in the present alternative embodiment, both immiscible fluids are placed into inner container 504. The same fluids used in defrost indicator 100 or 400 may be used in defrost container 500 (or visa versa). The embodiment in which two immiscible fluids are in container 504 is discussed further in conjunction with FIG. 6.

Legends 508 may include a brief description as to how to use the defrost indicator 500. For example, legends 508 may describe the appearance of the fluid within inner container 504 corresponding to different states of defrost indicator 500, such as "clear when defrosted" and/or "green when frozen" (indicating that if the fluid is still green the defrost indicator did not defrost and if the fluid is clear the defrost indicator defrosted at some point whether or not the fluid is currently frozen). Axis 510 is used for reference in FIGS. 6-8 to facilitate coordinating the orientation of the cut planes with the orientation of defrost indicator 500 in FIG. 5 and for labeling the directions of each axis that is used to form the cut planes.

Cross Section Cut Along XZ Plane

Figure 6:
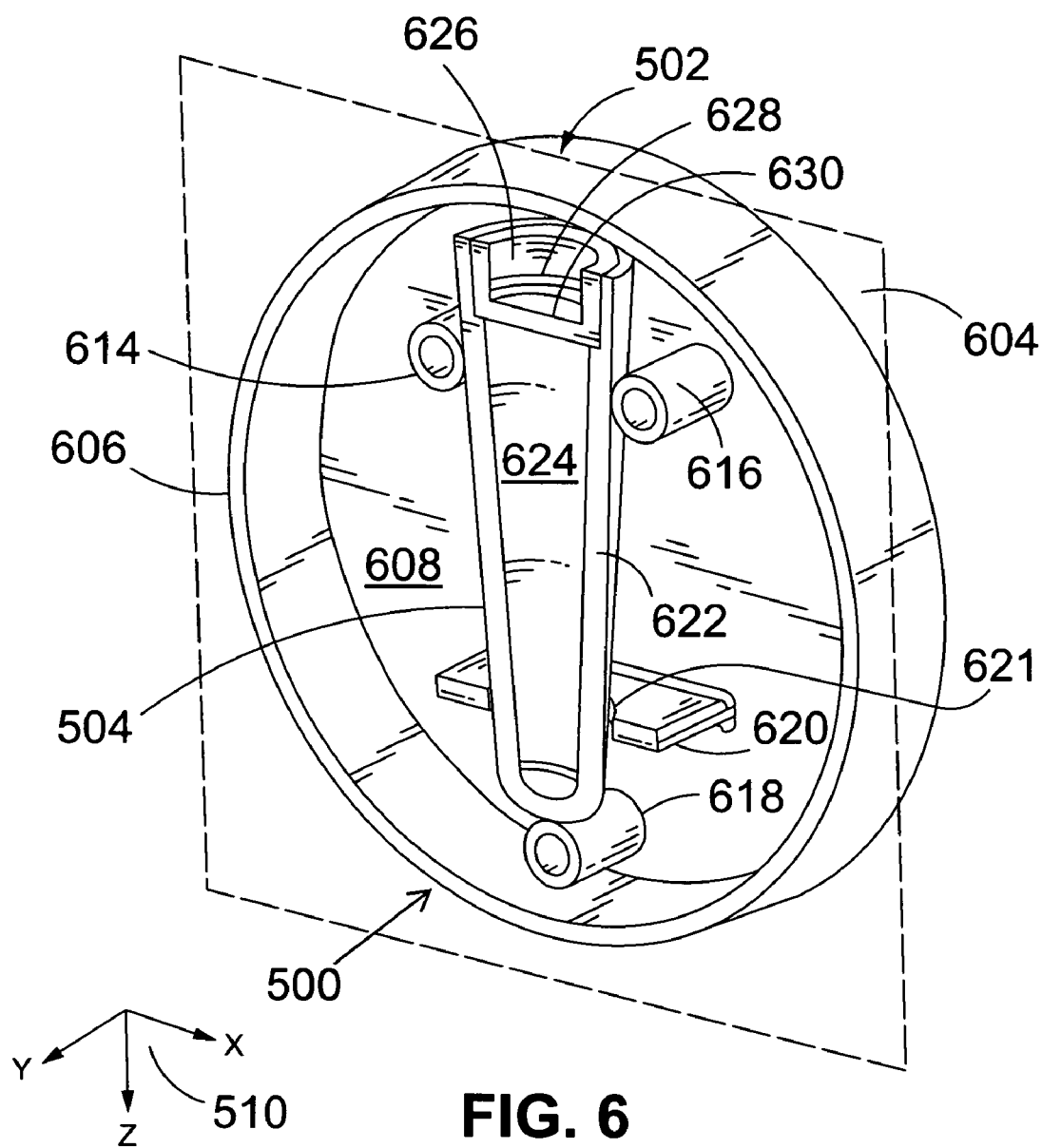
FIG. 6 shows a representation of a cross section along an xz plane of an embodiment of the defrost indicator of FIG. 5.

FIG. 6 shows a representation of a cross section along an xz plane of an embodiment of defrost indicator 500. FIG. 6 shows outer container 502, inner container 504, axis 510, plane 604, side wall 606, back wall 608, poles 614, 616, and 618, plate 620, opening 621, inner container walls 622, lower chamber 624, upper chamber 626, and stopper 628. FIG. 6 also shows axis 510. In other embodiments, the cross section along the xz plane may not have all of the elements or features listed and/or may have other elements or features instead of or in addition to those listed.

Outer container 502 and inner container 504 were discussed in conjunction with FIG. 5, and further details are discussed in conjunction with the remainder of the discussion of FIG. 6. Plane 604 is the xz plane is the plane along defrost indicator 502 was cut to show the cross section of FIG. 6.

Side wall 606 is a circular wall that encircles the rims of the back and front walls of outer container 502. Back wall 608 is the back wall of outer container 502. Poles 614, 616 and 618, protrude from back wall 608. In an embodiment, poles 614, 616, and 618 help facilitate holding back wall 606 to the front wall, and help facilitate keeping back wall 606 and front wall from collapsing inward or bowing outward. Poles 614, 616, and 618 help keep inner container 504 in one place. Plate 620 also helps keep inner container 504 in one place. Opening 621 is a notch or hole through plate 620 through which inner container 504 is placed. The combination of poles 614, 616, 618, plate 620, and the portion of side wall 608 that is immediately above inner container 504 hold inner container 504 securely in one place. The three point press fit provided by poles 614, 616, and 618, was found to be economical and resistant to loosening and failure more than other methods during the thermal cycling.

Inner container walls 622 are the walls of inner container 504, which keep the fluid within inner container 504 from leaking. In an embodiment, the walls of inner container 504 have a slant of a 7.75 deg slant from the vertical. In an embodiment, the inner surface of the walls of container 504 are given a No. 6 Diamond Finish, which give the correct surface tension profile during a defrost of the solution and a measured movement of the defrosting frozen fluid to allow for an indication of the melting that can be seen via the window (the No. 6 Diamond Finish is defined by ASME Y14.36M-1996, which is incorporated herein by reference). It was also found, following numerous testing, that the specific surface roughness of a No. 6 Diamond Finish provided the best results in terms of an indication via the outer casing detection window.

Lower chamber 624 is a lower portion of inner container 504, which in an embodiment is empty prior to defrosting defrost indicator 504.

Upper chamber 626 is an upper portion of inner container 504. In an embodiment, the fluid does not fill the entire inner container 504, and initially upper chamber 626 contains a frozen fluid prior to inner container 504 defrosting. The inner container 504 includes some sort of support for holding frozen fluid within the region in front of the window 506 on the front of the defrost detector 500. For example, as discussed above, the inner container may be wider at the top and narrower at the bottom, so that once frozen within upper chamber 624, the fluid stays in upper chamber 624 as a result of the slanting walls. As discussed above, in an embodiment, the walls of inner container 504 have been precision roughened to help hold the frozen fluid in place.

In another embodiment, other support structures are used. For example, a shelf (not shown) which may be a plate within inner container 504 that separates lower chamber 622 from upper chamber 624. The shelf may also support frozen fluid in upper chamber 624, keeping the frozen fluid form falling into lower chamber 622. There may be a hole in the shelf. When the fluid in upper chamber 624 melts, the fluid drips down into lower chamber 622. The shelf, the slanting walls of inner chamber 504, and the grooves are all optional. Any of the shelf, the slanting walls and/or the jagged walls may be used without the others, and any of the shelf, the slanting walls and/or the jagged walls may be used alone, in combination with any other means of keeping the frozen fluid in the upper container, or may be used all together with one another to keep the frozen fluid in the upper chamber 624 as long as the fluid remains frozen. Thus, the observer can tell whether defrost indicator 500 defrosted by checking whether the frozen fluid is still in upper chamber 624 through window 506 and/or by checking whether there is fluid in lower chamber 622. Stopper 628 closes inner container 504 and keep the fluid from escaping inner container 504 while the fluid is liquid and not frozen.

To use defrost indicator 500, the fluid is frozen while at least of portion of the fluid is in front of the window of the defrost indicator. For example, defrost indicator 500 may be held upside down while (with window 506 in the down position—closer the ground) the fluid is freezing. After freezing the fluid, defrost indicator 500 is placed in a freezer with window 506 in the up position with window 506 further from the ground then when in the down position. If the temperature of the fluid drops below its freezing point for a long enough time the fluid melts and falls to the bottom of inner container 504 into lower chamber 622. Then when the observer inspects the defrost indicator the observer does not see the colored fluid and the window is clear instead of having the color of the fluid. Thus, in this embodiment, an indication of a defrost is if the colored fluid is not visible in the window 506. Defrost indicator 500 may be reused by again turning defrost indicator upside down, with window 506 in the down position, and refreezing the fluid.

In the embodiments of FIGS. 5-8, correlating the states of defrost indicator 500 with the four states mentioned in the SUMMARY, the first state mentioned the SUMMARY is inner container 504 upside down so that the fluid is in the upper chamber 624 with the fluid in the liquid state. The second state mentioned in the SUMMARY is when the fluid is frozen and located in upper chamber 624. The third state mentioned in the SUMMARY is when the fluid is again in the liquid state, but now in lower chamber 622. The fourth state is when the fluid is frozen and in lower chamber 622.

To reuse the defrost indicator, if the fluid is frozen at a location such that the fluid is not visible in window 506, the fluid is allowed to melt. Then the defrost indicator is again positioned such that at least a portion of the fluid will freeze near the top of inner container 504 (again, for example, the defrost indicator is positioned upside down). As a result of the support (e.g. as a result of the narrowing of walls of the inner container, the shelf, and/or the jagged walls), after freezing the fluids while inner container 504 is upside down, the frozen liquid is suspended and prevented from falling to the bottom of the inner container 504. As long as the defrost indicator remains frozen, the frozen liquid remains in place, indicating that the temperature has not dropped to a low enough temperature and for a long enough time for a defrost to occur. In an alternative embodiment, the shelf has multiple holes instead of just one hole. In another embodiment, in addition to or instead of having one or more holes, the shelf is made from a porous material or a membrane that allows fluids to pass through. In an alternative embodiment, inner container 504 contains two immiscible fluids and upon defrosting, the fluid initially frozen in upper chamber 624 sinks into the lower chamber 622, which pushes the fluid initially in lower chamber 622 into upper chamber 624.

Cross Section Cut Along XY Plane

FIG. 7 shows a cross section of the defrost indicator cut horizontally half way between the top and the bottom of the defrost indicator. FIG. 7 shows outer container 502 and inner container 504. FIG. 7 also shows axis 510. Outer container 502 has side wall 606. FIG. 7 has XY plane 702 and outer container 502 also has front wall 708. In other embodiments, the cross section along the xy plane may not have all of the elements or features listed and/or may have other elements or features instead of or in addition to those listed.

Outer container 502, inner container 504, and side wall 606 were discussed above. XY plane 702 defrost indicator 500 horizontally halfway between the top and bottom of defrost indicator 500 showing a cross section of inner container 504, which shows another perspective of the components discussed in FIGS. 5 and 6.

Cross Section Cut Along YZ Plane

Figure 8:
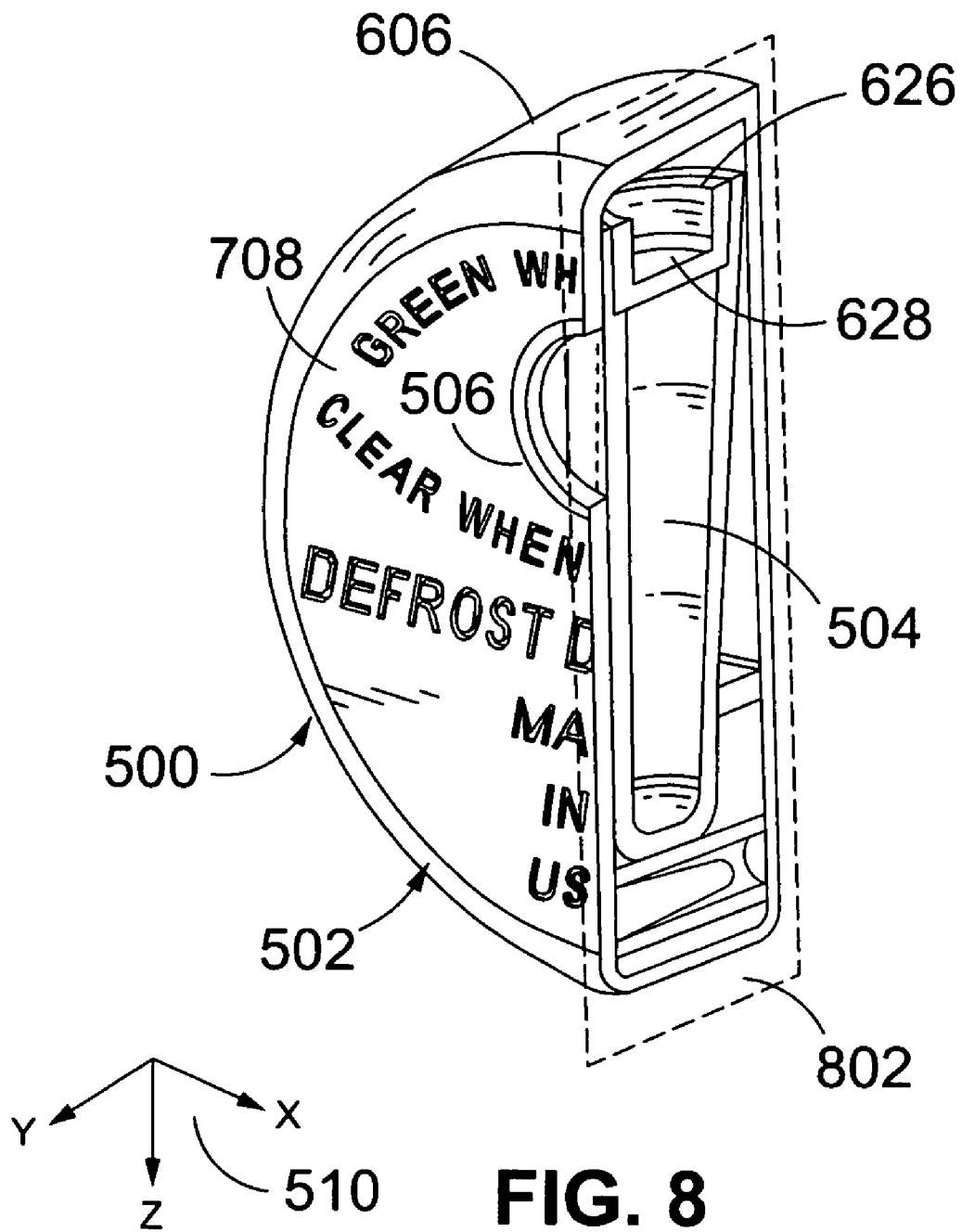
FIG. 8 shows a cross section of the defrost indicator of FIG. 5 cut vertically down the middle between the two sides of the defrost indicator.

FIG. 8 shows a cross section of the defrost indicator cut vertically down the middle between its two sides. FIG. 8 shows outer container 502 and inner container 504. FIG. 8 also shows axis 510. Outer container 502 has side wall 606 and front wall 708. Inner container 504 has upper chamber 626 and stopper 628. FIG. 8 also has YZ plane 702. In other embodiments, the cross section along the yz plane may not have all of the elements or features listed and/or may have other elements or features instead of or in addition to those listed.

Outer container 502, inner container 504, and side wall 606, front wall 708, upper chamber 626, and stopper 628 were discussed above. YZ plane 802 defrost indicator 500 vertically halfway between the two sides of defrost indicator 500 showing another cross section of inner container 504, which shows another perspective of the components discussed in FIGS. 5-7.

Defrost Indicator in Packaging

Figure 9:
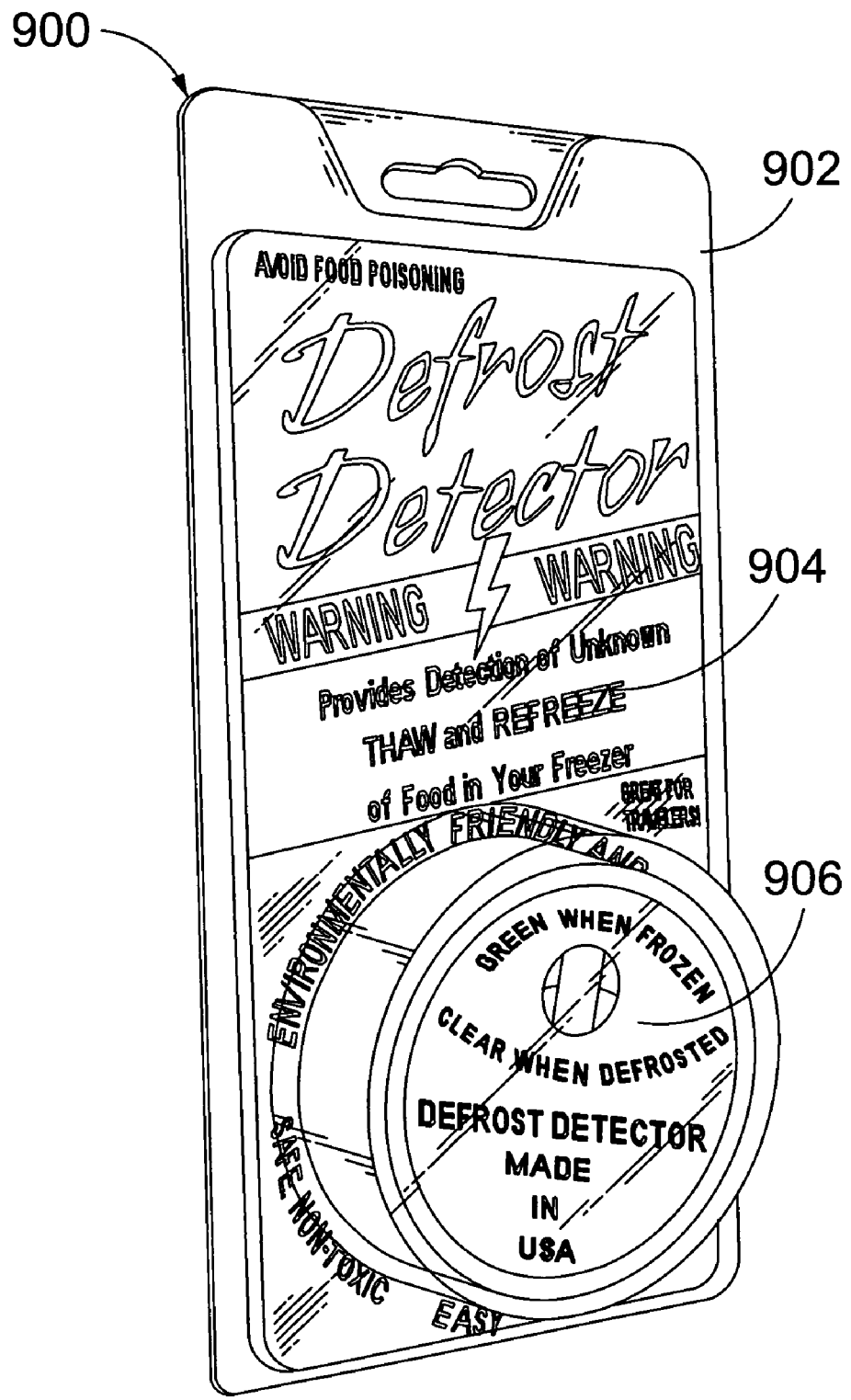
FIG. 9 shows a system having an embodiment of the defrost indicator within an embodiment of packaging within which the defrost indicator may be sold.

FIG. 9 shows system 900 having the defrost indicator within its packaging. System 900 may include packaging 902 having information 904 and enclosing defrost indicator 906. In other embodiments, system 900 may not have all of the elements or features listed and/or may have other elements or features instead of or in addition to those listed.

System 900 is one example of the manner in which a defrost indicator may be sold. Packaging 902 may be clear plastic having a slot on top for hanging system 900 while system 900 is in the store. Packaging 902 may enclose a card including information about the defrost indicator, such as how to use the defrost indicator. For example, defrost indicator may be sold with a description of the method FIG. 13, which is described below. Defrost indicator 906 may be one of defrost indicators 100, 400, 500 or another defrost indicator.

Another Embodiment of the Defrost Indicator

Figure 10:
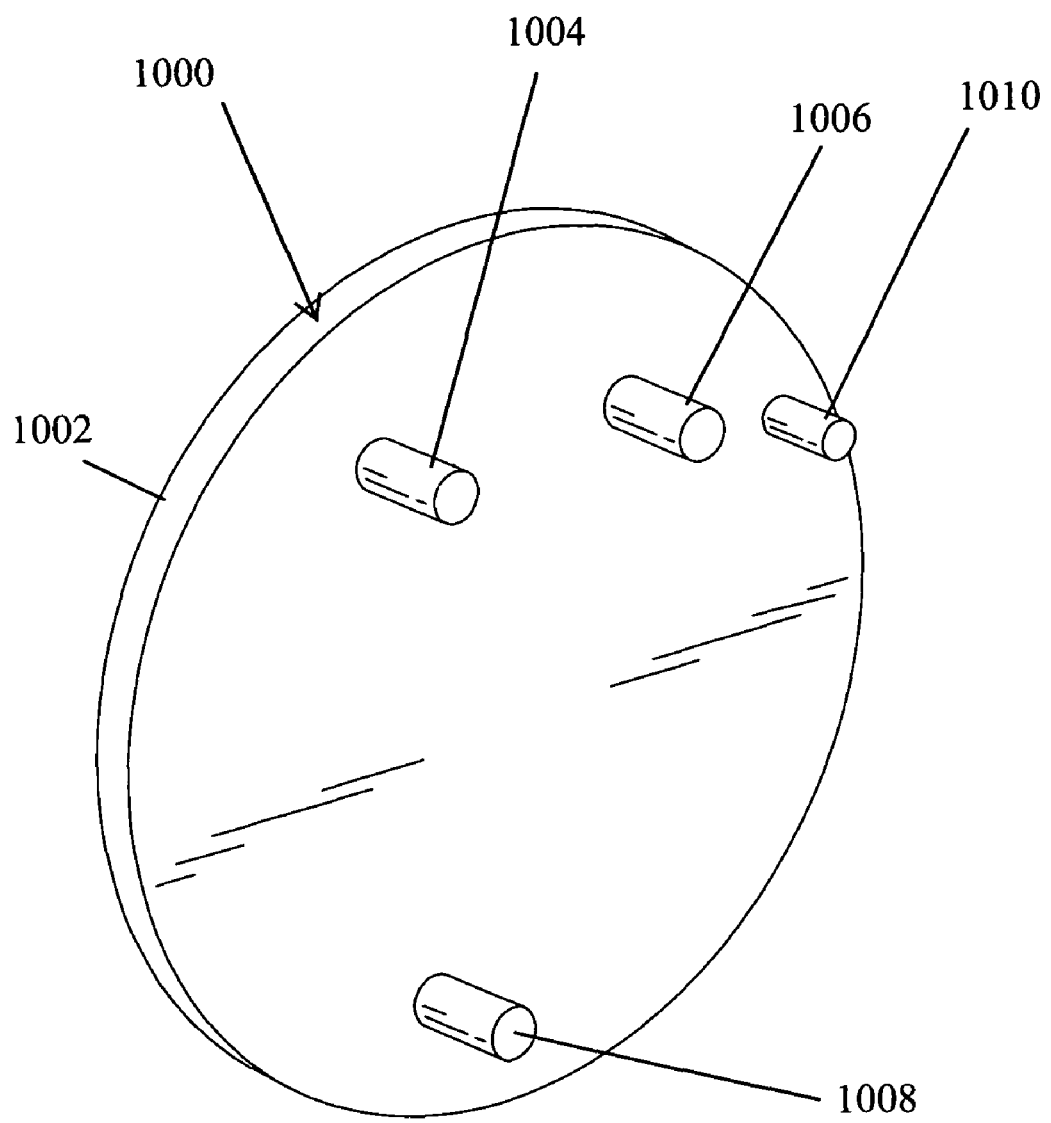
FIG. 10 shows a representation of a back plate of an embodiment of the defrost indicator.

FIG. 10 shows a representation of a back plate 1000 of an embodiment of defrost indicator 500. FIG. 10 shows back wall 1002, peg 1004, peg 1006, peg 1008, and peg 1010. In other embodiments, back plate 1000 may not have all of the elements or features listed and/or may have other elements or features instead of or in addition to those listed.

Back plate 1000 is the portion of defrost indicator 500 that is attached opposite plane 604 (FIG. 6). Back wall 1002 is the back wall of defrost indicator 500, which does not have a window. Pegs 1004, 1006, and 1008 help hold defrost indicator 500 together. Peg 1004 fits within and attaches to pole 614. Peg 1006 fits within and attaches to pole 616. Peg 1008 fits within and attaches to pole 618. Peg 1020 is optional. Peg 1020 helps guide back plate 1000 in place. In an embodiment peg 1020 rubs against wall 606 (FIG. 6), creating a friction-fit.

Figure 11:
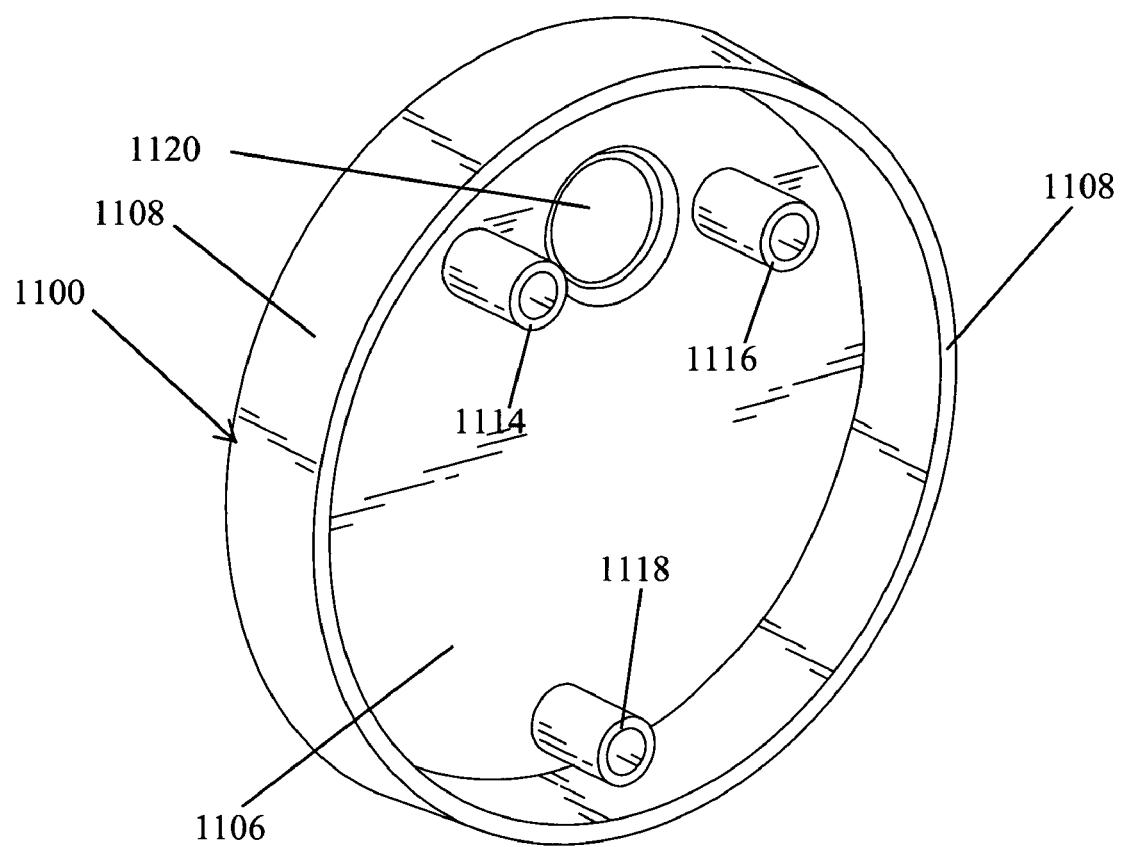
FIG. 11 shows a representation of a front cover of an embodiment of defrost indicator.

FIG. 11 shows a representation of a front cover 1100 of an embodiment of defrost indicator 500. FIG. 11 shows side wall 1106, back wall 1108, poles 1114, 1116, and 1118, and window 1120. In other embodiments, the front cover 1100 may not have all of the elements or features listed and/or may have other elements or features instead of or in addition to those listed.

Side wall 1106, back wall 1108, and poles 1114, 1116, and 1118 function in a similar manner and are structurally the same as side wall 606, back wall 608, and poles 614, 616 and 618, respectfully, which were described in conjunction with FIG. 5. Window 1120 is essentially the same as window 506, which was described in conjunction with FIG. 5. Front cover 1100 is different than the front cover formed by sidewall 606 and back wall 608 in that the front cover of FIG. 6 has plate 621, whereas the front cover 1100 does not have any corresponding structure.

Figure 12:
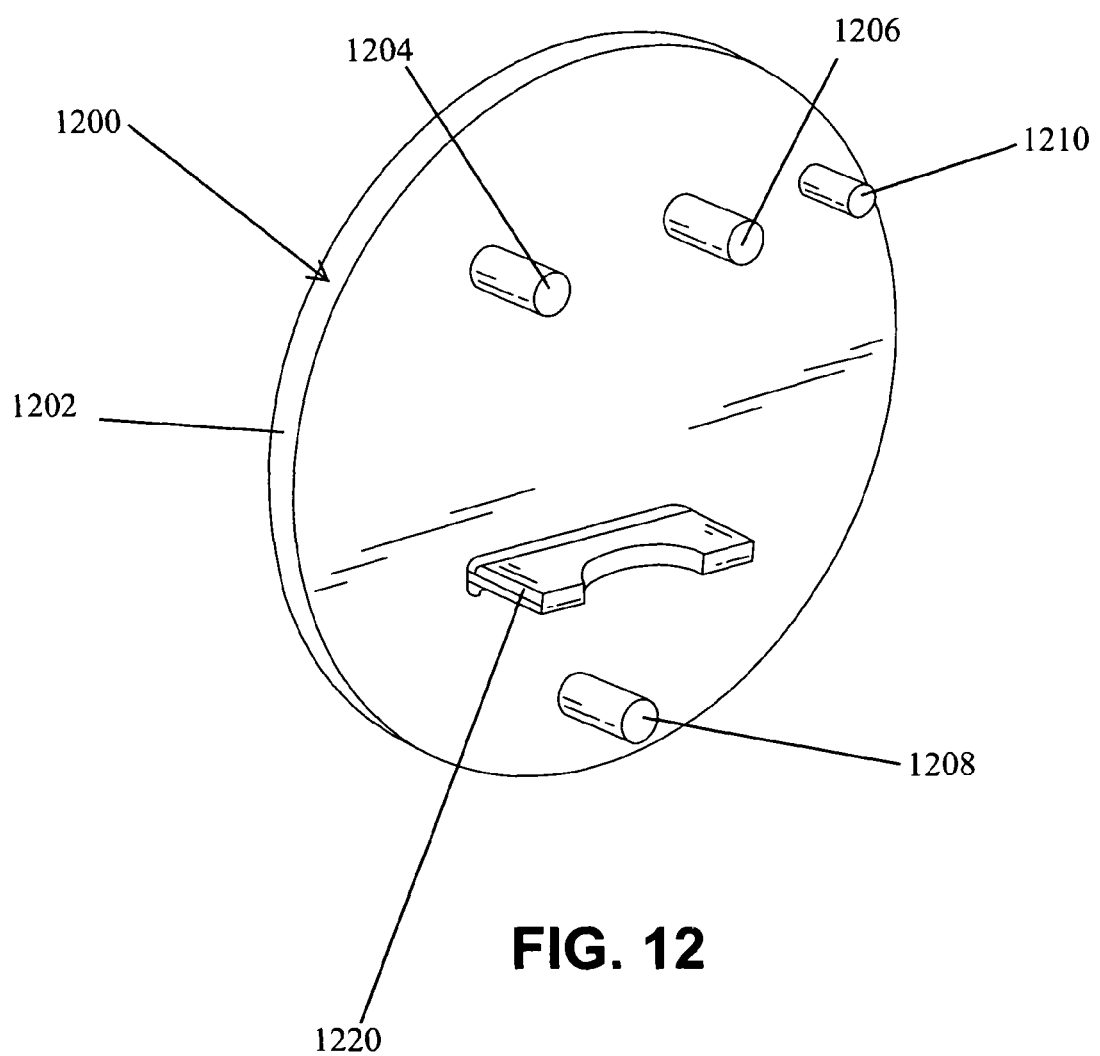
FIG. 12 is a representation of a back plate of an embodiment of the defrost indicator of FIG. 5.

FIG. 12 shows a representation of a back plate 1200 of an embodiment of defrost indicator 500. FIG. 12 shows back wall 1202, peg 1204, peg 1206, peg 1208, peg 2010, plate 1220. In other embodiments, back plate 1200 may not have all of the elements or features listed and/or may have other elements or features instead of or in addition to those listed.

Back plate 1200 is the portion of defrost indicator 500 that is attached opposite plane 604 (FIG. 6). Back wall 1002 is the back wall of defrost indicator 500, which does not have a window. Pegs 1004, 1006, and 1008 help hold defrost indicator 500 together. Peg 1004 fits within and attaches to pole 614. Peg 1006 fits within and attaches to pole 616. Peg 1008 fits within and attaches to pole 618. Peg 1020 is optional. Peg 1020 helps guide back plate 1000 in place. In an embodiment peg 1020 rubs against wall 606 (FIG. 6), creating a friction-fit. Plate 1220 is similar in function and structure to plate 620, which was described in FIG. 6. However, whereas plate 620 was on the front cover, plate 1220 is on back cover 1200.

Method of Making Defrost Indicator

Figure 13:
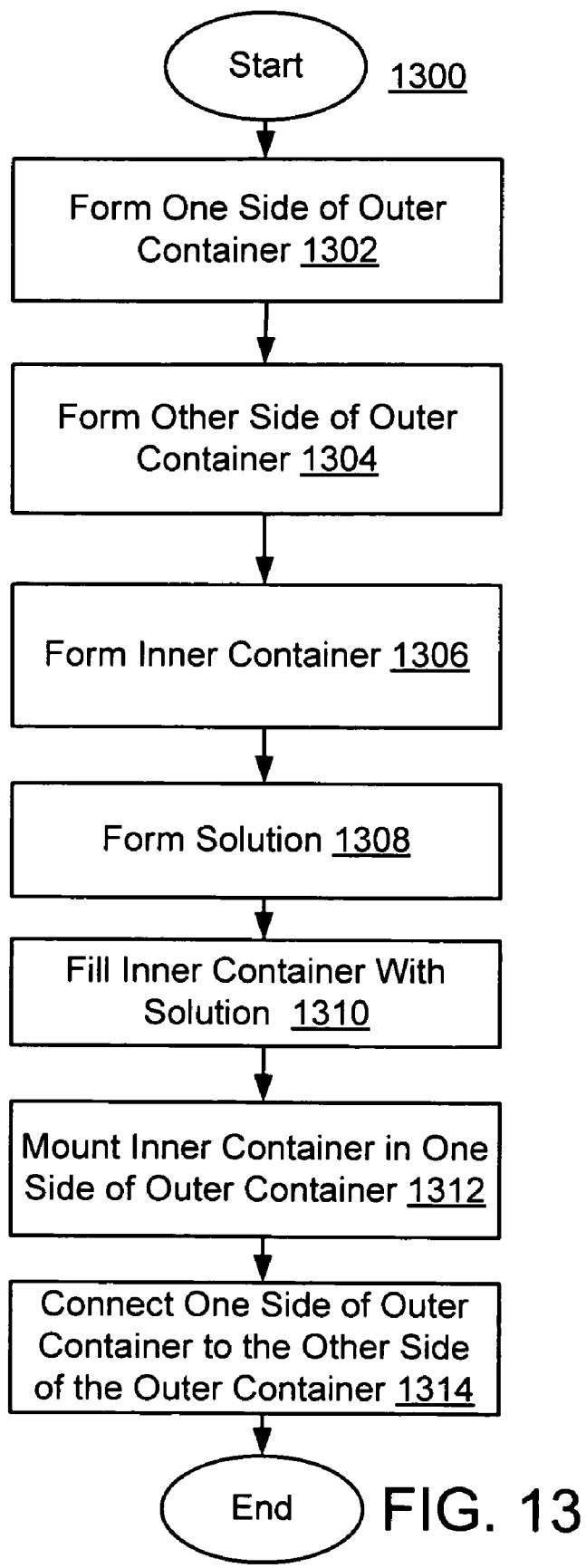
FIG. 13 shows an embodiment of a method of making a defrost indicator.

FIG. 13 shows an embodiment of a method 1300 of making a defrost indicator. In step 1302, one side of outer container 102, 402, or 502 is made. For example, in the case of defrost container 500, the side made may include back wall 608, side walls 606, poles 614, 616, and 618, and shelf 620. In step 1304, another side of outer container 102, 402, or 502 is made. For example, in the case of defrost container 500, the side made may include front wall 708, which may enclose a structure that engages poles 614, 616, and 618 and shelf 620. For example, wall 708 may include depressions into which poles 614, 616, and 618 and shelf 620 fit snugly. As another example, there may be depressions at the ends of poles 614, 616, and 618 and a corresponding set of protrusion on front wall 708 that fit snugly into the depression at the ends of poles 614, 616, and 618.

In the case of defrost indicator 400 there may be an additional step of forming the strip of a self sealing material, such as a self-sealing rubber.

In step 1306 the inner container is formed leaving an opening through which fluid may be added. In the case of defrost indicator 400, step 1306 is skipped, because there is no inner container.

In step 1308 the fluid is formed, which may involve dissolving a salt, coloring, in water. If two immiscible fluids are used, then both fluids are formed as part of step 1308. In step 1310 the fluid is added to the inner container. Optionally, in the case of inner container 504, there may be two fluids that are added to the inner container. Step 1308 may also include sealing the inner container, which may include attaching and/or adhering a stopper to one end, for example. In step 1312, the inner container is mounted to one side of the outer container. In one embodiment, the inner container may be permanently attached to that side of the inner container. In another embodiment, the inner container may be removably held in place. For example, in defrost container 500, inner container 504 may be removably mounted and held in place by walls 606, poles 614, 616, and 618, and shelf 620. In the case of defrost indicator 500 optionally the back half and the front half of the inner container 504 may be made separately and then joined together via ultrasonic welding.

In step 1312, the two sides of the outer container are attached to one another. The two parts of the outer container may be joined together by ultrasonic welding. For example, one side of the outer container is attached to the other side in which the inner container was mounted. In the case of defrost container 100, optionally, a second fluid may be added to the outer container that is immiscible with the fluid in the inner container 104. In the case of defrost indicator 400, step 1312 may also include attaching the self sealing plate to the outer container, thereby sealing the outer container so fluid does not leak. The fluid may be added to defrost container before or after sealing. If the fluid is added after sealing the fluid is injected through the self sealing material. Optionally, the parts of inner and outer container may be formed by injection molding.

In an embodiment, each of the steps of method 1300 is a distinct step. In another embodiment, although depicted as distinct steps in FIG. 13, step 1302-1312 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Method of Using Defrost Indicator

Figure 14:
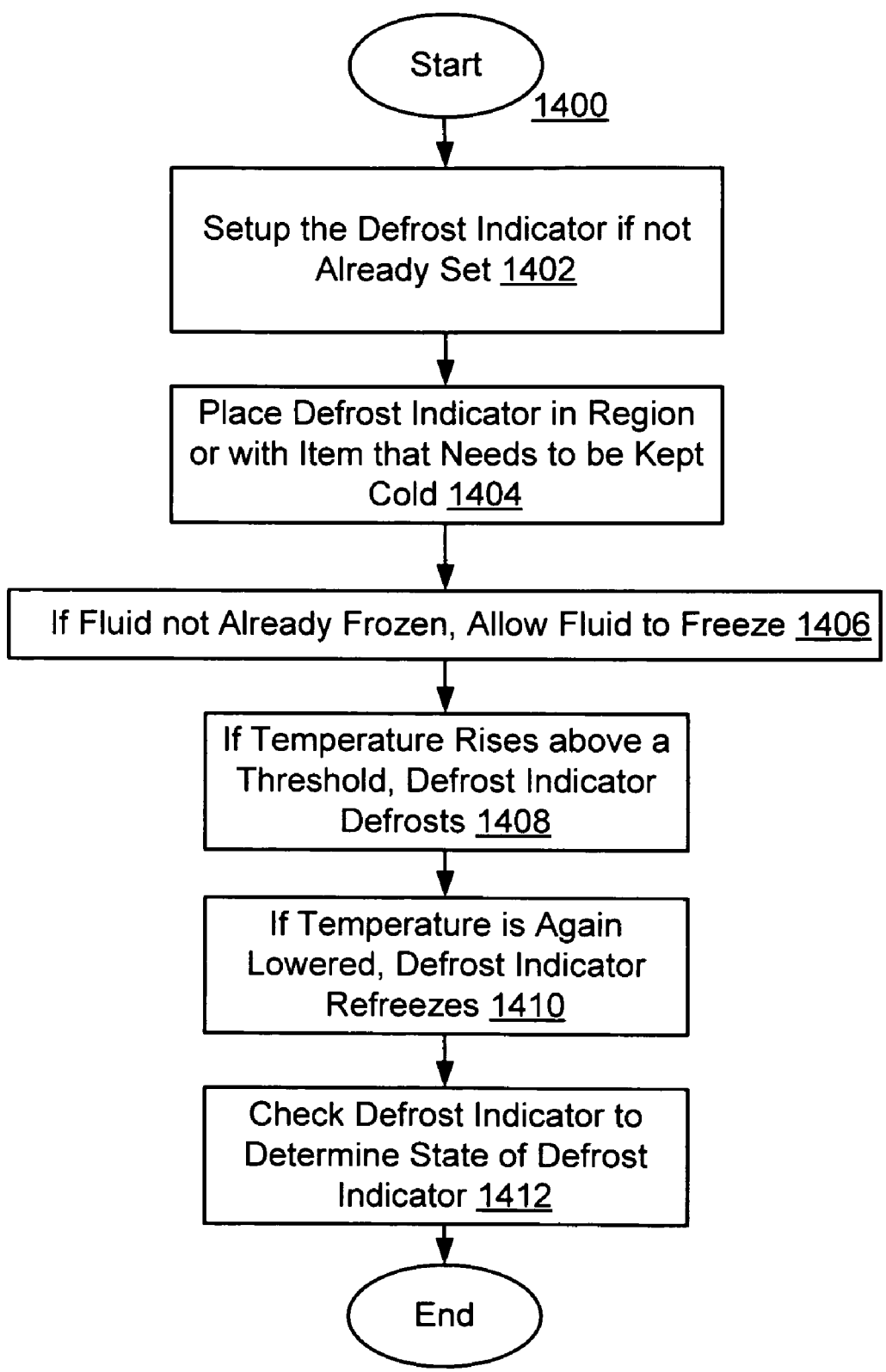
FIG. 14 shows an embodiment of a method of using the defrost indicator.

FIG. 14 shows an embodiment of a method of using the defrost indicator. In step 1102, if not already setup, the defrost indicator is setup. For example, in the case of defrost indicator 100, inner container 104 may need to be replaced if it cracked as a result of defrosting during the last usage of defrost indicator 100. As another example, in the case of defrost indicator 400, if fluid leaked out as a result of defrosting in during the last usage, more fluid is added by injecting the fluid through self sealing material 406. As yet another example, in the case of defrost indicator 500, if fluid 506 melted, defrost indicator 500 may be turned upside down and refrozen. Additionally, if defrost indicator 100, 400, or 500 has been sitting the fluid in a liquid state for a period of time long enough for the solids to settle out of the solution (e.g., the salt may crystallize and the impurities may settle to the bottom), it may be desirable to shake defrost container 100, 400, or 500.

In step 1404, the defrost indicator is placed in a region that is desired to be kept at a temperature that is at or lower than the freezing point.

In step 1406 if fluid is not already frozen, the fluid is allowed to freeze. For example, in the case of defrost indicator 100, fluid 106 is frozen causing inner container 104 to crack, or in the case of defrost indicator 400 the fluid is allowed to freeze causing the weak portion 404 to crack. In step 1408, if the temperature of the defrost indicator rises, the fluid begins to defrost. In the case of defrost indicator 100, the fluid leaks out of inner container 104 into outer container 102. In the case of defrost indicator 400, the fluid leaks out of defrost container 401. In the case of defrost indicator 500, the fluid in the upper chamber flows or drips into the lower chamber as the fluid melts. In step 1412, the defrost container is checked to see if its state has changed.

In an embodiment, each of the steps of method 1400 is a distinct step. In another embodiment, although depicted as distinct steps in FIG. 14, step 1402-1412 may not be distinct steps. In other embodiments, method 1400 may not have all of the above steps and/or may have other steps in addition to or instead of those listed above. The steps of method 1400 may be performed in another order. Subsets of the steps listed above as part of method 1400 may be used to form their own method.

Further Discussion, Alternatives, and Extensions

In an embodiment, defrost indicator 100, 400, or 500 is used for indicating whether breast milk defrosted. Breast milk freezes at approximately 0.00-0.55 deg C., and fluid 106 is formulated to indicate whether the breast milk defrosted. In an embodiment, the defrost indicator 100, 400, or 500 has a built in factor of safety, because defrost indicator 100, 400, or 500 will defrost in a range from 30.5-32.0 deg F., when defrost indicator 100, 400, or 500 is placed in a home freezer. In an embodiment, the composition of the mixture that makes up fluid 106 is adjusted so that defrost indicator 100, 400, or 500 tends to defrost quicker than a 4-12 oz. container of breast milk. In an embodiment, the composition of the mixture that makes up fluid 106 is adjusted so that defrost indicator 100, 400, or 500 tends to defrost at a higher temperature than breast milk (e.g., one or two degrees centigrade higher). If breast milk defrosts and then refreezes, the breast milk could spoil and be dangerous for the baby (and in some cases may cause death in infants). Similarly, defrost indicator 100, 400, or 500 may be used as an indicator as to whether frozen precooked shrimp or ice cream defrosted and then refroze, which could also be dangerous.

Ultrasonic welding of the capsules seals the capsules in excess of 99% of tests from leakage beyond 40 freeze/defrost thermal cycles. Additionally, a surface roughness of a No. 6 Diamond polish was found to be well suited for a controlled plug decent while the solution defrosts along a slide slope of 7.75 deg.

In an embodiment, the instructions are molded into an off white ABS plastic casing. In an embodiment, the writing on the casing has a depth of greater than 0.005 in. In an embodiment, the writing on the casing has a depth less than or equal to 0.012 in. In an embodiment, the writing on the casing has depth of greater than 0.005 in. and less than or equal to 0.012 in. In another embodiment, the depth of the writing is less than or equal to 0.009-0.010 in. In an embodiment, the depth of the mold is greater than 0.005 in. and less than or equal to 0.009-0.010 in. In an embodiment, the depth of writing of the instructions less than or equal to 0.12 in. and less than or equal to 0.12 in. In another embodiment, the depth of the writing is in the range of 0.006-0.007 in. In another embodiment, the depth of the writing is in the range of 0.006-0.009 in. In another embodiment, the depth of the writing is in the range of 0.006-0.008 in. In another embodiment, the depth of the writing is 0.007 in.

The deeper the depth of the writing, the higher the contrast (and the easier it is to read the writing), but the shallower the depth of the writing, the less likely outer container 502 will crack and the lower the contrast. Experimentally, at a 0.005 in. depth, the writing is legible, but difficult to read as a result of poor contrast. At a depth of 0.012 in. the contrast is high and consequently the writing is relatively easy to read, but cracking was found to be an issue. At a 0.009-0.010 in. depth, the writing had a near 50% failure rate as a result of crater cracking after approximately 10-20 thermal cycles. At a 0.006-0.007 in. depth, the writing had only a 1% failure rate as a result of crater cracking after more than 40 thermal cycles and thus in an embodiment the depth of the writing is set to 0.006 to 0.007 in. In another embodiment, the writing is raised above the surface of outer container 502.

Although outer containers 102 is shown as a disc in FIGS. 1-3, inner container 104 is shown as a cylinder in FIGS. 1-3, container 402 is shown as a disc in FIG. 4, outer container 502 is shows as a disc in FIGS. 5-8, inner container 504 is shown as a cylinder in FIGS. 5-8, any of the containers could be cubic, spherical, tetrahedron, and/or may have a face or cross section that is square, triangular, circular, rectangular, ovular, or any other three-dimensional shape. In an embodiment, any of outer container 102, inner container 104, container 401, outer container 502, and/or inner container 504 may be made from ABS plastic, polycarbonate, such as poly bisphenol A carbonate, sold by GE under the name Lexan, and/or another material.

In another application, the temperature at which that the item being monitored freezes is not relevant, but the temperature at which the item being monitored stays fresh and/or does not spoiling is relevant. In other words, the defrost indicator may freeze at a temperature that the item being monitored must be kept at or kept lower than, even though the freezing point of the item being monitored is below (or even above) the freezing point of the defrost indicator. Thus in this embodiment, even though the item being monitored never freezes, the state of the defrost indicator indicates whether or not the temperature of the item being monitored was kept below a temperature that ensures that the item being monitored remains fresh.

In an alternative embodiment, inner chamber 504 may be used as the only container, without outer container 502. In another embodiment, a fluid with a low boiling temperature may be kept in an open container (which optionally may be located within an outer container). When the temperature raises above the boiling point, the liquid boils and evaporates out of the container. If the temperature drops back down below the boiling temperature, although the liquid may condense most the liquid will condense outside of the container, so that the observer can determine that the temperature rose above the boiling point of the liquid because most of the fluid will no longer be located in the original container that fluid was placed.

Although water and fluids containing water tend to expand as they freeze, most fluids do not expand as they freeze. Although in the above examples, the weak portion (e.g., the thin glass or plastic) of defrost indicators 100 or 400 breaks as a result of the saline solution expanding, defrost indicator 100 or 400 could be configured so that weak portion (e.g., the thin glass or plastic) cracks as a result of another mechanical strain or thermal strain, and consequently a fluid that does not expand could be used instead of the saline solution. In and embodiment of defrost indicator 100 or 400, a fluid that does not contain water is used, and inner container 104 or container 401 and weak walls 404 are designed to crack upon freezing the container as a result of the pressure dropping when the fluid freezes.

Defrost indicators 100, 400, or 500 could be included in, or attached to, the packaging or the exterior of frozen food packaging. In an embodiment, the defrost indicator is attached, via a magnet or a low temperature adhesive, to the inside of a freezer, package, or other container for an item that is supposed to remain frozen. The defrost indicator could provide a good "quick check" indication to consumers and/or merchants using the freezer or transporting the item that indicates whether the temperature rose higher than it was supposed to and therefore may have defrosted. Some examples of applications of the defrost indicator are for detecting whether or not high end, perishable frozen foods, such as seafood and ice cream, were subject to temperatures that were above freezing.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A device comprising:
    walls enclosing an indicator including at least a material that has at least two reversible states that are visibly distinct from one another, a first of the two reversible states occurs when the indicator is initially frozen while the indicator is in a first orientation, and a second of the two reversible states occurs as a result of the indicator defrosting and refreezing while the indicator is in a second orientation, the two reversible states are reversible in that once in the second state, by defrosting the indicator, reorienting the indicator to the first orientation, and refreezing the indicator, the state of the indicator is changed from the second state back to the first state, so that the indicator is ready for reuse, without opening the indicator;
    the walls including at least one wall having at least a portion through which the material is visible while the material is in at least one of the at least two reversible states, the state of the indicator being determinable by looking into the window, the material being a fluid, the indicator including a container having two chambers between which fluid that is not frozen is not inhibited from flowing by structural features into either container, the fluid that is not frozen is not inhibited from flowing at all times including prior to use, in the first of the two reversible states, the fluid is frozen and located within a first of the two portions of the container, and in the second of the two reversible states at least some of the fluid that was in the first of the two portions of the container is now in a second of the two portions of the container, the fluid being visible via the window when the fluid is in at least one of the two reversible states.

2. The device of claim 1, the two portions of the container being two chambers, and the container having a shelf that supports the frozen fluid while the fluid is frozen, but the shelf is permeable to fluids and allows the fluid that melts to move to the second chamber, the shelf being permeable without having been broken or ruptured by the user.

3. The device of claim 1, the two portions of the container being two chambers, and the container having a shelf that supports the frozen fluid while the fluid is frozen, but the shelf having a hole prior to use that need not be created by the user, the hole allows the fluid that melts to fall to the second chamber.

4. The device of claim 1, the container having side walls that are slanted forming a top portion that is wider than a lower portion, in the first state the frozen fluid is located in the top portion and is held in the top portion as a result of being frozen to a shape that is too wide to fit in the lower portion.

5. The device of claim 1, the container having side walls that are jagged in at least a top portion, in the first state the frozen fluid is located in the top portion and is held in the top portion as a result of being frozen to a shape that is engages the jagged surface of the top portion.

6. A device comprising:

walls enclosing an indicator including at least a material that has at least two states that are visibly distinct from one another., a first of the two states occurs when the indicator is initially frozen and a second of the two states occurs as a result of the indicator defrosting and refreezing, the walls including at least one wall having at least a portion through which the material is visible while the material is in at least one of the at least two states, the state of the indicator being determinable by looking into the window, the material being a fluid, the indicator including an inner container having two chambers., in the first of the two states, the fluid is frozen and located within a first of the two portions of the inner container, and in the second of the two states at least some of the fluid that was in the first of the two portions of the inner container is now in a second of the two portions of the inner container, the fluid being visible via the window when the fluid is in at least one of the two states, the device further including at least an outer container; and the inner container being mounted within the outer container.

7. The device of claim 6, the outer container having a window through which the first of the two portions is visible.

8. The device of claim 1, the fluid being colored.

9. The device of claim 1, the fluid being saline solution.

10. The device of claim 1, the fluid including a coloring and Sodium Cloride (ppm) 2100-1750.

11. The device of claim 1, the fluid including water including at least 0.04-0.00 ppm of boron, 0.70-0.0000 ppb bromodichloromethane, 0.50-0.0000 ppb bromoform, 34.20-11.80 ppb calcium, 1.00-0.0000 ppb chloroform, 0.80-0.0000 ppb dibromochloromethane, 11.00-6.36 ppb magnesium, 00243-0.00 ppm perchlorate, 3.95-1.88 ppm potasium, 609.70 pci/L radon 222, 0.09-0.00 ppm copper, 1.3-0.00 ppm flouride, 9.70-0.00 ppm total nitrates, 14.00-0.00 ppm sulfate, 3.00-0.00 ppb trihalomethane, and 5.2-0.0 pci/L gross beta.

12. The device of claim 4, the slant being 7.75 degrees from being vertical.

13. The device of claim 5, the jagged wall having a roughness of a No. 6 diamaond finish.

14. The device of claim 6, the inner container has at least a conical shape, a top chamber and a bottom chamber that are open to one another;

the inner chamber being sealed so that the fluid does not escape;

the inner container is filled with the fluid and 40% air.

15. The device of claim 14, the outer container having the window, via which the inner container is visible;

the outer container having a front piece and a back piece that are connected together to form the outer container;

the outer container having a first set of three posts on one of the front piece and back piece;

the outer container having a second set of three posts on another of the front piece and back piece, the first set of three posts mate with the second set of posts when the front piece and back piece are joined together;

the outer container including a shelf with a hole; and the inner container being held in a fixed place by at least one of the first set of three posts, the second set of posts, and the hole in the shelf.

16. A device comprising:

a container having walls enclosing an indicator, the walls including a strong portion and a weak portion;

the strong portion is strong enough that the strong portion is expected not to crack as a result of freezing the container while full with a fluid; and the weak portion is weak enough so that the weak portion is expected to crack when the container is frozen while full with the fluid;

the indicator including at least a material that has at least two states that are visibly distinct from one another a first of the two states occurs when the indicator is initially frozen and a second of the two states occurs as a result of the indicator defrosting and refreezing, the walls including at least one wall having at least a portion through which the material is visible while the material is in at least one of the at least two states, the state of the indicator being determinable by looking into the window.

17. The device of claim 16, the container having a window via which one can see whether the fluid leaked out of the container.

18. The device of claim 16, the container having a portion of the walls that is made from a self sealing material.

19. A device comprising:
a container having at least walls, and
a fluid in the container that only fills a portion of the container, the container having walls that are contoured to support the fluid while the fluid is frozen;
as a result of the walls that are contoured, while the container is in a first state of two reversible states, the fluid is held in a first location while the fluid is frozen, the first location being within the container having the contoured walls, the container remains in the first state as long as the fluid remains frozen, and
the fluid is allowed to flow to a second location as the fluid melts, once the fluid melts and refreezes with the fluid in the second location the container is in a second state of the two reversible states,
the container being shaped so that after being in the second state and after the fluid melts, as a result of the shape of the container, the fluid will tend to return to the first location when the container is reoriented in a particular orientation.,
the two reversible states are reversible in that once in the second state, by defrosting the container, reorienting the container, and refreezing the container, the state of the container is changed from the second state back to the first state, so that the indicator is ready for reuse, without opening the container.

20. A method comprising:
freezing a fluid in a location where the fluid is supported as long as the fluid remains frozen, the location being within a container, the location being open to other parts of the container even prior to use,
without any portion of the container breaking and without any structural features of the location breaking, the fluid flowing away from the location as the fluid melts, the flowing of the fluid being visible.

21. The method of claim 20 further comprising:
checking whether the frozen liquid is still in the location where the fluid is supported as long as the fluid remains frozen, and determining whether the defrost indicator defrosted based on whether the frozen liquid is still in the location where the fluid is supported as long as the fluid remains frozen.

22. The method of claim 21,
if the fluid has flowed away from the location where the fluid is supported,
(a) if the fluid is frozen, allow fluid to melt,
(b) reorient the defrost indicator so that the fluid, while unfrozen, flows back into the where the fluid is supported, and
(c) refreeze the fluid, while the fluid is in the location where the fluid is supported, so that the defrost indicator is ready for reuse in indicating whether there was s defrost.

23. A method comprising:
forming an indicator by at least
contouring at least a first location within the indicator where the frozen fluid is initially stored to support the frozen fluid;
the contouring of at least the first location causing a second location to be formed, the second location being a location within the indicator where the fluid flows to when the fluid in the first location melts, and the second location being formed so that all of the fluid flows back to the first location when the indicator is reoriented;
forming a transparent portion on the indicator, via which the frozen fluid in the container may viewed; and
placing a liquid within the indicator;
sealing the indicator so that fluid does not escape the indicator while melted;
the indicator having at least two reversible states that are visibly distinct from one another, a first of the two reversible states occurs when the indicator is initially frozen while the indicator is in a first orientation, and a second of the two reversible states occurs as a result of the indicator defrosting and refreezing while the indicator is in a second orientation, the two reversible states are reversible in that once in the second state, by defrosting the indicator, reorienting the indicator to the first orientation, and refreezing the indicator, the state of the indicator is changed from the second state back to the first state, so that the indicator is ready for reuse, without opening the indicator.

* * * * *